UNITED STATES PATENT OFFICE.

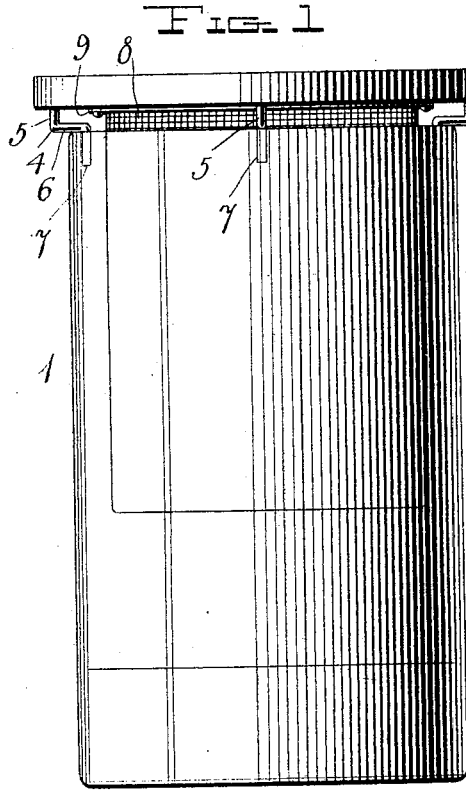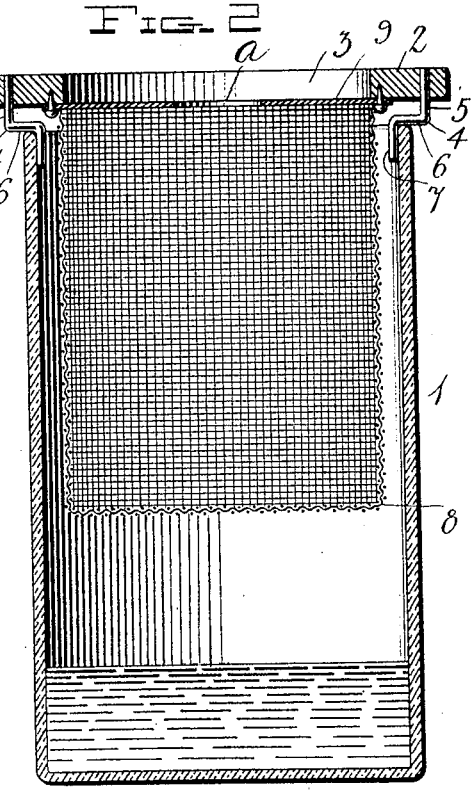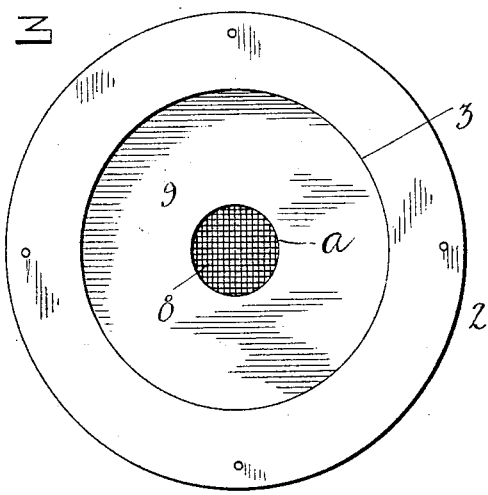

JAMES R. EDGAR, OF STERLING, KANSAS.

MOTH-TRAP.

No. 805,352.      Specification of Letters Patent.      Patented Nov. 21, 1905.

Application filed April 6, 1905. Serial No. 254,205.

*To all whom it may concern:*

Be it known that I, JAMES R. EDGAR, a citizen of the United States, residing at Sterling, in the county of Rice and State of Kansas, have invented certain new and useful Improvements in Moth-Traps; and I do declare the following to be a full, clear, and exact description of the invention, such as will enable others skilled in the art to which it appertains to make and use the same.

This invention relates to moth-traps designed more particularly for the purpose of catching the destructive codling-moth; and one of the principal objects of the same is to provide a moth-trap of simple construction which will be efficient in use and which will not require the use of a lamp or light of any kind.

Another object is to provide a moth-trap with a reflecting-disk above the top to give a bright light within the trap to attract the moth.

These and other objects are attained by means of the construction illustrated in the accompanying drawings, in which—

Figure 1 is a side elevation of a moth-trap made in accordance with my invention. Fig. 2 is a central vertical section of the same, and Fig. 3 is a plan view of the lid or cover of the trap.

Referring to the drawings for a more particular description of the invention, the numeral 1 designates a jar, crock, or other receptacle of uniform diameter preferably from end to end. A cover or lid 2, provided with a circular central opening 3, is supported at a slight distance above the top of the jar on legs 4. These legs, preferably four in number, each consist of a vertical upper member 5, suitably secured to the cover 2, a horizontal portion 6, adapted to rest on the upper edge of the jar 1, and a depending arm or flange 7, adapted to fit the jar and engage the inner wall of the same. A wire-gauze screen 8, of cylindrical form, has connected to its upper end a disk of bright material 9, like tin or isinglass, and this screen is secured under the lid 2, together with the reflector 9. This reflector is provided with a central opening *a* to admit light, while the lid 2 is raised above the jar 1 sufficiently to also admit light within the jar. The reflector 9, having a smooth bright surface, will reflect the admitted light to the bottom of the jar.

The trap is baited with sweet cider or sweetened cider-vinegar, and this bait may be placed within the jar 1 to a height of, say, three or four inches. The natural food of the codling-moth is apple-juice, and the moths will enter the jar over the upper edge thereof between the lid and the top of the jar. If the moth should attempt to fly out of the jar, the wings would come in contact with the wire screen, owing to the fact that the space between the screen and the wall of the jar is not sufficient to let the moth escape by flight, even if such an attempt were made.

From the foregoing it will be seen that my moth-trap is of simple construction, can be manufactured at slight cost, and is reliable and efficient in use.

Various changes in the form, proportion, and the minor details of construction may be resorted to without departing from the principle or sacrificing any of the advantages of this invention.

Having thus described my invention, what I claim as new, and desire to secure by Letters Patent, is—

1. A moth-trap comprising a receptacle, a centrally-apertured lid, legs secured to the lid and bent to rest upon the upper edge of the receptacle and to extend down within the receptacle to support the lid above the top of said receptacle, a cylindrical screen, and a reflector connected thereto, said screen being secured below the central aperture in the lid, substantially as described.

2. A moth-trap comprising a jar or receptacle, a lid supported above the top thereof, a screen and a reflector depending from the lid, substantially as described.

In testimony whereof I have hereunto set my hand in presence of two subscribing witnesses.

JAMES R. EDGAR.

Witnesses:
    THOMAS ATKINSON,
    C. A. STUBBS.